June 21, 1966  C. B. JONES  3,257,571
POWER GENERATOR
Filed Dec. 31, 1962
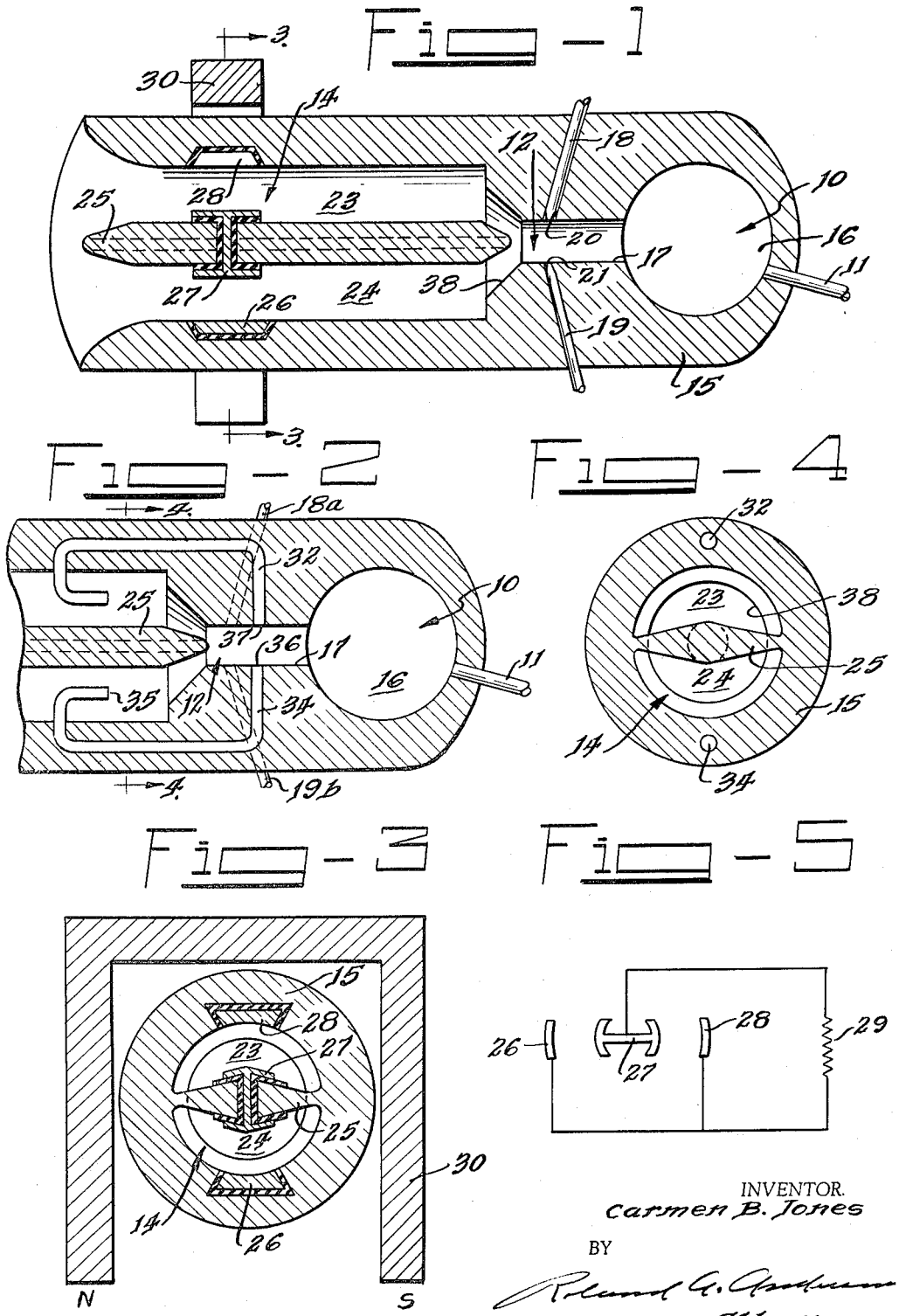
INVENTOR.
Carmen B. Jones
BY
Roland G. Anderson
Attorney

United States Patent Office 3,257,571
Patented June 21, 1966

3,257,571
POWER GENERATOR
Carmen B. Jones, Canoga Park, Calif., assignor, by mesne assignments, to United States of America as represented by the United States Atomic Energy Commission
Filed Dec. 31, 1962, Ser. No. 248,824
6 Claims. (Cl. 310—11)

This invention relates to the generation of electrical power without the use of any rotating parts such as a turbine or dynamoelectric machine.

In particular the invention relates to the combination of a magnetohydrodynamic generator and a fluid triode to generate alternating current by varying or altering the flow of ionized gases across a magnetic field to generate alternating current.

It has long been desired to eliminate rotating machine from the apparatus generally used to generate electricity. One proposed method has been to pass an ionized gas through a magnetic field since such a magnetic field would deflect the positive and negative ions in different paths such that the negative ions and electrons could be collected. However, such ideas have usually been abandoned because of their low potential efficiency.

To improve on the efficiency it has been suggested that the gas be injected tangentially to the magnetic field so that the gas ions would spiral within the field for a longer time period than if they had merely been shot through the field, an arrangement possible with my invention. In addition, it has been suggested that such devices would have improved performance if the gas injection was pulsed such as by placing a rotating shutter disc between the gas source and the magnetic field and output electrodes.

While it has been theoretically possible to generate electricity by previous suggestions, even though inefficiently, such suggestions have generally related to the generation of direct current; direct current has obvious limitations in the electrical energy field today because of its transmission problems and limited applications. Accordingly, there is a great need for devices which can automatically generate alternating current without any moving parts.

Accordingly, it is an object of this invention to provide improved apparatus and methods of converting the kinetic energy of fluids or ionized gases directly into electrical energy.

Another object is to provide improved appaartus for directly generating alternating current.

A still further object is to directly generate alternating current by improved apparatus for controlling injection of gases into a magnetic field.

A still further object of this invention is to provide a magnetohydrodynamic generator which may produce direct current or alternating current of fixed or variable frequency by relatively simple control means.

These and other objects of my invention are provided by the use of a fluid triode which controls the flow of ionized gas alternately down two adjacent channels in the presence of a magnetic field; the channels have electrodes arranged with respect to each other and the magnetic field such that when the ionized gas flows down one channel, voltage of one polarity is generated while flow of gas down the other channel generates voltage of the opposite polarity. If the fluid is controlled to flow down only one channel direct current is generated; if the fluid triode is controlled as a switch, the voltage output is A.C. at a frequency depending upon the control; if the fluid triode has degenerative feedback to thereby act as a free running fluid oscillator, the voltage output is A.C. at the frequency determined by the feedback and circuit parameters and independent of any control; when the fluid triode is controlled as a monostable oscillator or amplifier or other device whose frequency can be controlled, the frequency of the alternating current is similarly controlled.

The apparatus for performing the above-mentioned objects will now be disclosed in the following detailed description of which:

FIG. 1 is a diagrammatic plan view in section;
FIG. 2 is a modification of FIG. 1 illustrating the use of feedback;
FIG. 3 is a cross section along lines 3—3;
FIG. 4 is a cross section taken along lines 4—4; and
FIG. 5 is a schematic diagram of the electrode connections.

While this invention relates to apparatus for directly converting the kinetic energy of fluids or gases into electrical energy, an important component in this apparatus is the fluid triode.

A "fluid triode" as the name implies is a fluid device which is similar to the electronic triode tube in that it has an input, output and a control means. Since this fluid triode has many other characteristics which permit it to operate like other well known electronic circuits, it seems desirable to briefly indicate some of those circuits from which the terminology is derived.

A basic tube is a diode which is merely a device to permit current flow in one direction with no means to control such current flow. In order to control current flow, a triode was developed having a grid as well as the cathode and anode of the diode; variation of the electrical potential to the grid varied the amount of current between the anode and cathode.

Such electronic devices can also be used for merely switching or controlling currents or for amplification. One example of an electronic switching or trigger circuit is to utilize two tubes interconnected with electrical feedback circuits. By a well known variation of the feedback circuit at least three types of trigger circuits are possible namely bi-stable, mono-stable or free running. The free running type is one which alternates in conduction between the two tubes and is therefore a type of oscillator; the bi-stable type is a device which is stable in either of the two conditions it is capable of being in; thus when an input or control pulse is received one tube is made conducting and remains conducting while the other tube is non-conducting. Receipt of a second input or control pulse causes a reversal of the above situation. A monostable circuit is the same as the above except that when the control pulse is received and the conducting condition of the tubes is reversed, after a time delay determined by the circuit constants which may be variable, the tubes return to their orginal condition which is the only stable condition.

In addition to the above-mentioned terminology, feedback from the output to the input is called regenerative if it is the same polarity as the input and degenerative if of the opposite polarity thereby respectively increasing or decreasing the output energy.

Referring now to FIG. 1 there is shown a sectional view of my magnetohydrodynamic generator including the three main components namely a source of ionized gases 10, the fluid triode 12 and the output circuit 14. A common casing 15 encloses all three components and is generally made of metal and/or ceramics to withstand the high temperatures necessary in these devices. The chamber 16 encloses the hot ionized gases. These gases may be externally ionized and injected at inlet 11 into 16 or may be ionized within the chamber itself by heat or RF field or other known methods.

Since the chamber 16 becomes narrow at 17, the gases are ejected at substantial velocity into the fluid triode 12.

The fluid triode shown at 12 is a specific type namely the degenerative type as will be discussed subsequently, but it may be regenerative or may be just a fluid triode without feedback in which control jets are used to switch the direction of fluid flow.

Control jets 18 and 19 extend through the casing and enter the gas passageway at 20 and 21. Now as pressure is applied at either 19 and 18 the ionized gas ejected at 17 is deflected either upward or downward into either channel 23 or 24. As will be seen subsequently, when the control jets vary the fluid flow alternately in 23 and 24, alternating current is generated at the electrodes in 14. The diverter 25 is in the center of the gas passageway and may extend across the passageway to divide it into two independent sections or merely divert the gas into two different directions.

As the ionized gas flows down channel 24, the negative ions collect at electrode 26 while the positive ions collect at the central electrode 27. When fluid flow is reversed to flow into channel 23, thus producing open circuit conditions between electrodes 26 and 27 due to the absence of a conducting (ionized gas) medium between them, the negative ions flow to the central electrode 27 and the positive ions flow to electrode 28. As shown schematically in FIG. 5, this produces an alternating current through a load resistor 29. The direction of the electrons, negative ions and positive ions is determined by the magnet 30 which is more clearly shown in FIG. 3 and which produces a field into the paper in FIG. 1 such that the magnetic field is perpendicular to ion channel path and the plane of the electrodes so that ionized gases passing along either channel 23 or 24 are deflected perpendicular to the magnetic field.

Now while we referred to the control jets 19 and 18 as the means for deflecting the ionized gas, FIG. 1 may be modified as shown in FIG. 2 to disclose a system which does not need such control jets. In particular, the fluid triode of FIG. 2 includes degenerative feedback by means of tubes 32 and 34. The operation of this feedback is such that if the ionized gas from 16 is passing through channel 24, part of this fluid is tapped off at 35 and returns through 34 to an inlet at 36. This pressure at 36 is degenerative in that it opposes the passage of fluid to channel 24 and attempts to direct it into channel 23. If the tube 34 and inlet 35 are properly designed it is clear that the feedback of gas will actually switch the direction of gas flow. Thus the degenerative system may be of two types, the first type is one in which feedback attempts to switch the direction of gas flow but needs an assist from the control jets at 18a and 19b; in this case when the pressure at control jets 18a and 19b is varied at a particular rate, the gas flow is switched back and forth between channel 23 and 24 at that rate. In the second type of operation, the rate and amount of feedback is adjusted so that the feedback itself will do the switching and control jets are not needed except for starting or possibly synchronizing the operation. This second type operation is what would be a free running oscillator in electronic terms. The frequency of a free running oscillator is determined by the time constants in the feedback circuit and similarly in the degenerative fluid triode, the frequency of oscillation will depend upon the time required for gas from 16 to enter 17, pass down channel 24, enter 35 and return on 34 to inlet 36.

Of course it is understood that tube 32 functions in the same manner as 34 when the gas is in channel 23.

While there are many possible modifications of the fluid triode, it will be appreciated that if tubes 32 and 34 were rearranged to provide there returns (36 and 37) on opposite sides of channel 17 than as shown, then the feedback through each of these pipes would be regenerative. Such regenerative type feedback would hold the gas deflected in one direction and would provide stability of gas flow. In this case, the control jets 18 and 19 would be required for switching.

Accordingly, this invention uses a fluid triode in which fluid pressure is introduced at inlet 16 at approximately 1000 pounds per square inch; control jets 18 and 19 similar to the grid of a tube may have only a pressure of 10 pounds per square inch and yet control the deflection of the fluid. Accordingly, two control jets may switch a power jet back and forth between two output apertures.

As to the manner of controlling the switching of the fluid between channels 23 and 24, it will be apparent that there are many methods depending upon the use desired. For example for generating alternating current the pressure at the jets may be alternately varied at the desired frequency so that the fluid alternately flows to channels 23 and 24 at the desired frequency.

Alternatively the pressure at one of the control jets may be at a fixed reference pressure (similar to a fixed grid bias on a tube), while the pressure at the other control jet is varied above and below this reference pressure at the desired frequency.

One characteristic of the electronic trigger art is that conduction from one tube to another may be initiated by a narrow pulse and that state of conduction continues subsequently even in the absence of the pulse. Similarly the control pressure at the control jets 18 and 19 may receive only a sharp narrow pulse to switch the direction of fluid flow since a low static pressure is formed by the fluid flow at the wall at 38 for example whereby the fluid will continue to flow in the direction to which it has been switched even after extinguishment of the control jet pulse and until a control pulses is initiated at the other jet. Thus a fluid triode as shown in FIG. 1 is inherently bi-stable because of this low static pressure which is formed by the action of the jet. It should be noted that amplification is being obtained in that a small control pressure is altering the flow of a high pressure fluid.

Having thus described one embodiment of my invention and recognizing that there are many possible modifications, the scope of my invention is defined in the following claims.

I claim:

1. An alternating current generator comprising a source of high temperature ionized gas, a pair of juxtaposed elongated fluid conducting channels, electrical output electrodes mounted within said channels for connection to an electrical load, one of said electrodes being common to both of said channels, means for generating a magnetic field transverse to the plane of said electrodes and said channels, and fluid triode means for alternately deflecting said ionized gases between said channels at a controlled rate.

2. The combination as in claim 1 in which the fluid triode includes two control jets disposed between said source of ionized gas and said channels.

3. The combination as in claim 1 in which the fluid triode includes means for feeding back a portion of the gas in each of the channels to a point between the source of gas and the channels.

4. The combination as in claim 3 in which the feedback is degenerative.

5. Electrical generating apparatus comprising a hollow casing, said casing having one end adapted for containing high temperature ionized gas, means for dividing the interior of said casing into at least two juxtaposed channels, fluid triode means within said casing for alternately deflecting said ionized gas into said channels, and magnetic field means and electrode means positioned along said channels for collecting ions alternately at diffferent electrodes whereby alternating current is generated.

6. Apparatus as in claim 5 in which one of said electrodes is common to both of said channels and is supported by the dividing means.

References Cited by the Examiner

UNITED STATES PATENTS

| 3,111,931 | 11/1963 | Bodine | 137—81.5 |
| 3,162,781 | 12/1964 | Beckwith | 310—11 |
| 3,185,166 | 5/1965 | Horton | 137—81.5 |

OTHER REFERENCES

Publication: Science and Mechanics, June 1960, pp. 81–84.

MILTON O. HIRSHFIELD, *Primary Examiner.*

DAVID X. SLINEY, *Examiner.*